United States Patent

Regla et al.

[11] Patent Number: 4,679,876
[45] Date of Patent: Jul. 14, 1987

[54] ELECTRICAL CONNECTOR AND AN ELECTRICAL TERMINAL

[75] Inventors: Juan Regla; Jose Lazaro, both of Barcelona, Spain

[73] Assignee: AMP Incorporated, Harrisburg, Pa.

[21] Appl. No.: 910,912

[22] Filed: Sep. 24, 1986

[30] Foreign Application Priority Data

Sep. 30, 1985 [GB] United Kingdom ............... 8524065

[51] Int. Cl.⁴ .............................................. H01R 4/24
[52] U.S. Cl. ..................................................... 439/426
[58] Field of Search ............... 339/95 R, 95 D, 97 R, 339/97 P, 98, 99 R

[56] References Cited

U.S. PATENT DOCUMENTS 3,852,702 12/1974 Dowling ........................... 339/97 R
4,039,239 8/1977 Cobaugh et al. ................. 339/97 R
4,232,927 11/1980 Stull .................................. 339/99 R Primary Examiner—Joseph H. McGlynn
Attorney, Agent, or Firm—Thomas G. Terrell

[57] ABSTRACT

An electrical connector, especially for making connection to a fine, varnish insulated wire, comprises a terminal and a housing for receiving it. The wire is carried in slots in the housing. The terminal comprises a pair of wire gripping plates which are urged resiliently together in contiguous relationship. As the terminal is inserted into the housing, the plates are initially cammed apart by wedges in the housing so that the wire is received between the plates. Upon full insertion of the terminal, the wedges enter notches in the plates so that the latter resile to grip the wire the insulation of which is pierced by serrations on one of the plates. Frictional wear on the wire is thereby avoided.

10 Claims, 9 Drawing Figures

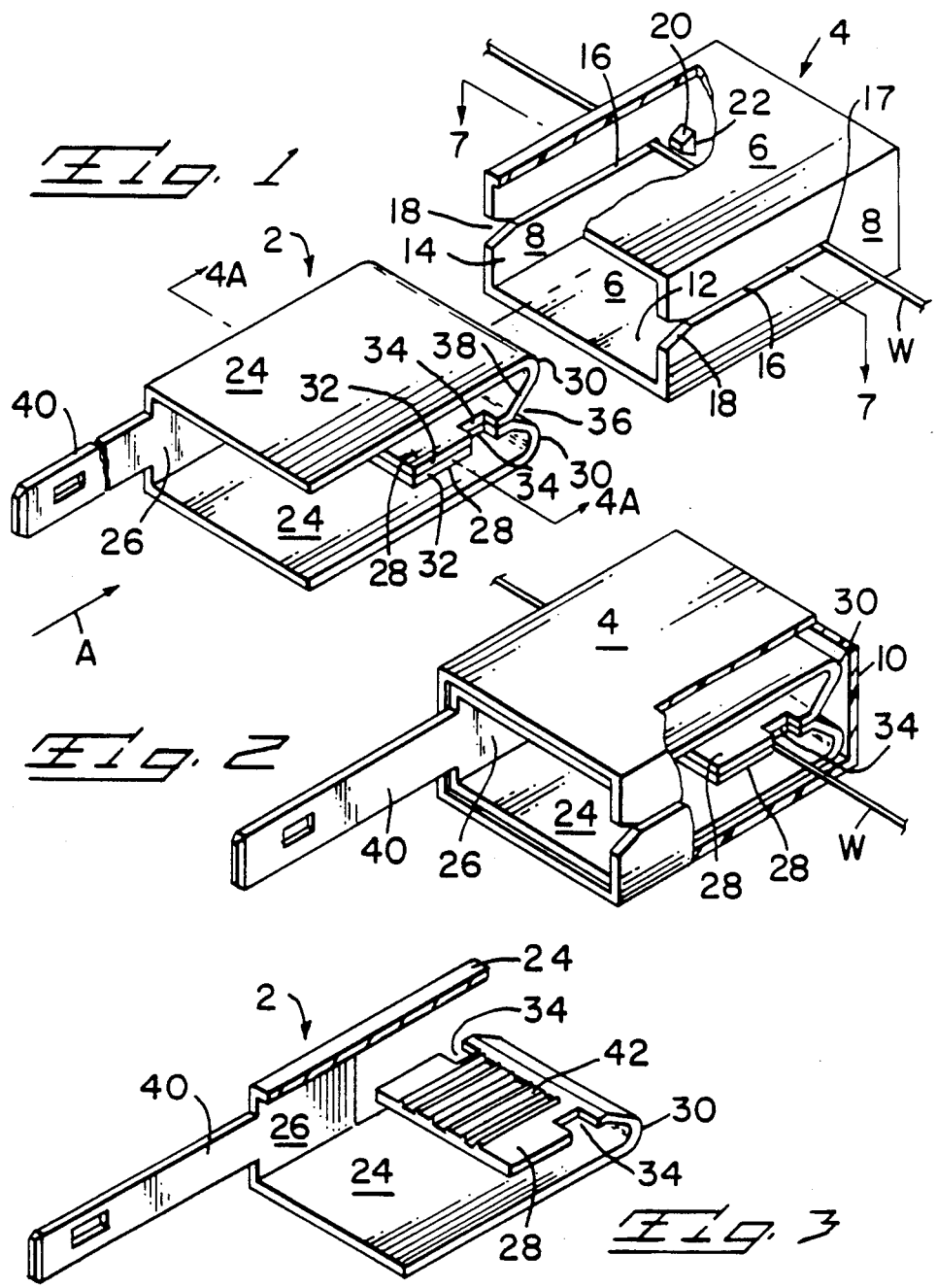

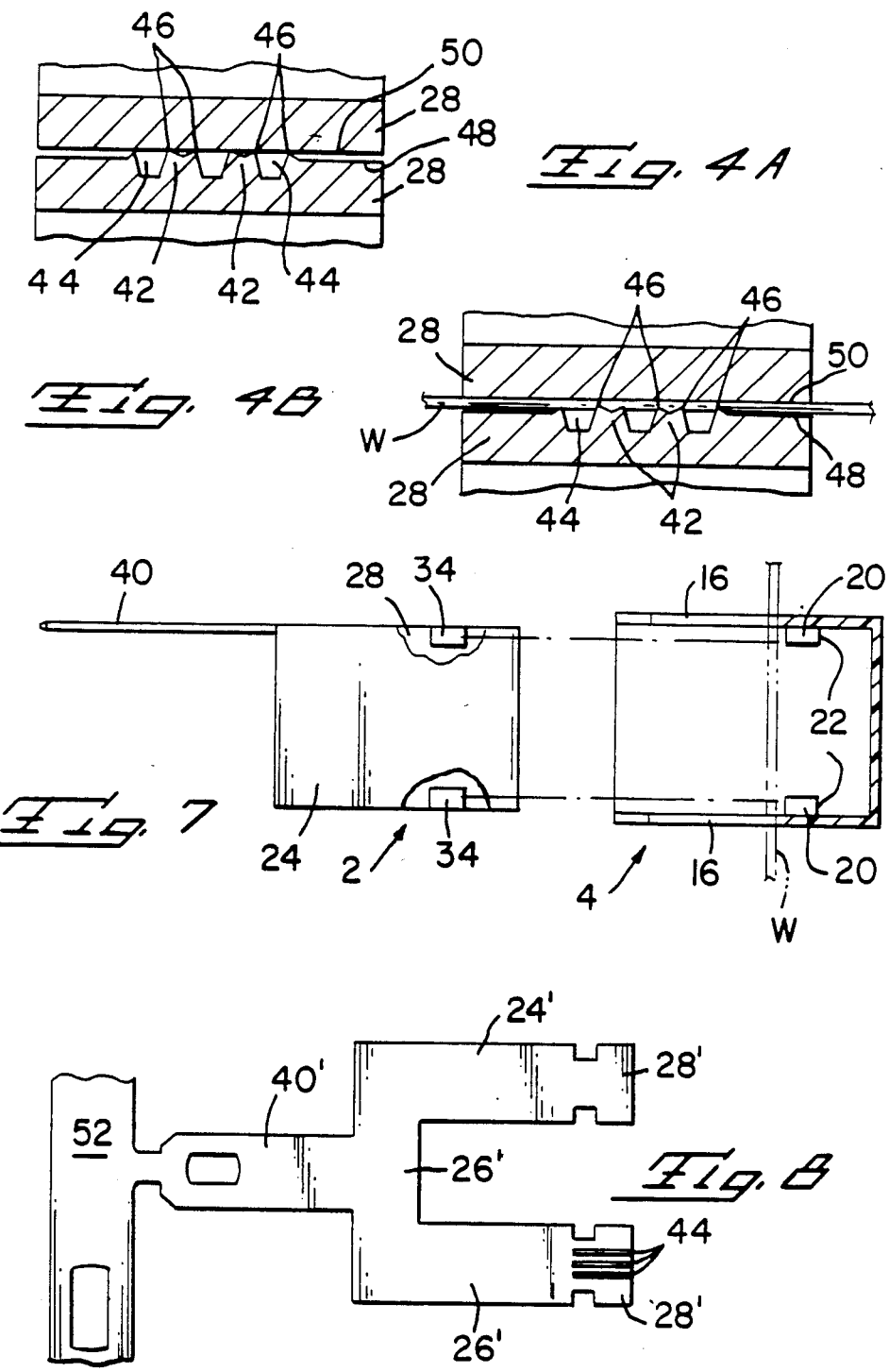

ELECTRICAL CONNECTOR AND AN ELECTRICAL TERMINAL

This invention relates to an electrical connector and an electrical terminal.

There is described in GB-A-1,522,863, an electrical connector comprising an electrically insulating housing having walls defining a terminal receiving cavity, the housing having an open end and an opposite end, two opposed walls of the housing each being formed with a wire receiving slot extending from said open end towards said opposite end, and an electrical terminal comprising a pair of interconnected, superposed, wire gripping plates provided with aligned openings therein, the terminal being insertable into said cavity through said open end to make electrical connection with a wire extending through said wire receiving slots.

The connector just described is used, for example, for connecting the magnet wire of an electric motor stator to an electrical lead. In this known connector the plates are formed with slots into which the wire is forced as the terminal is inserted into the cavity. The wire is accordingly subjected to frictional wear by the edges of these slots.

The present invention is intended to provide such a connector and a terminal therefore which is suitable for connecting a fine wire e.g. of 0.10 to 0.20 millimeters in diameter (for example of a field coil of a small electric motor or solenoid), to an electrical lead.

According to one aspect of the invention, said wire gripping plates are resiliently biased against one another with opposed faces thereof in contiguous face to face relationship, the housing being provided with wedge means projecting into the cavity to force the plates apart from each another to receive the wire between said opposed faces of the plates, as the terminal is being inserted into the cavity, the wedge means and said openings in the plates being so relatively arranged that the wedge means subsequently enter said openings to allow the plates to resile against the wire to grip it. Said frictional wear on the wire is thereby substantially avoided.

The wedge means may comprise a pair of wedges, one projecting from each of said opposed walls of the housing, and the openings being in the form of notches provided in opposite edges of each wire gripping plate.

The wedge means when engaged in the openings, act to restrain withdrawal of the terminal from the cavity.

Where the wire is insulated, for example, with a varnish insulation, at least one of the opposed faces of the plates is provided with insulation piercing means. To this end, one of the opposed faces of the plates may be formed with serrations from the crests of which project insulation piercing blades extending perpendicularly to the direction in which the wire is received between the plates.

The terminal may comprise a further pair of spaced parallel plates, between which the wire gripping plates are contained, each of the wire gripping plates being connected to one of the further plates by a bight, these bights cooperating to provide a flared mouth for guiding the wedge means between the wire gripping plates. The further plates may project beyond the wire gripping plates in a direction away from the mouth and are preferably connected together by a web which is positioned beyond the wire gripping plates, in such direction. A tab, or other means for connecting a lead to the terminal may conveniently be formed with the web.

According to another aspect of the invention, a one-piece stamped and formed electrical terminal comprising a pair of first plates connected together in spaced, opposed, substantially parallel relationship by means of a web; is characterized by a pair of second superposed plates arranged in substantially parallel, contiguous relationship and each being connected to one of the first plates by a bight, the bights cooperating to urge proximate faces of the second plates against one another and defining a mouth opening away from the second plates, each second plate having formed in an edge thereof which is adjacent to said mouth, a notch which is in alignment with a corresponding notch in the other one of the second plates.

For a better understanding of the invention, reference will now be made by way of example to the accompanying drawings in which:

FIG. 1 is a perspective view of an electrical connector comprising an insulating housing and a terminal for insertion thereinto to make electrical connection with an electrical wire extending through the housing;

FIG. 2 is a similar view to that of FIG. 1 but with part of the housing removed and showing the terminal mated with the housing and electrically connected to the wire;

FIG. 3 is a perspective view of the terminal with part removed;

FIG. 4A is a view taken on the lines 4A—4A of FIG. 1;

FIG. 4B is a view taken on the lines 4B—4B of FIG. 6;

FIG. 7 is a view taken on the line 7—7 of FIG. 1; and

FIG. 8 is a plan view of a sheet metal blank from which the terminal was formed.

The electrical connector comprises a one piece, stamped and formed electrical terminal 2 and an insulating housing 4.

Figure 5:
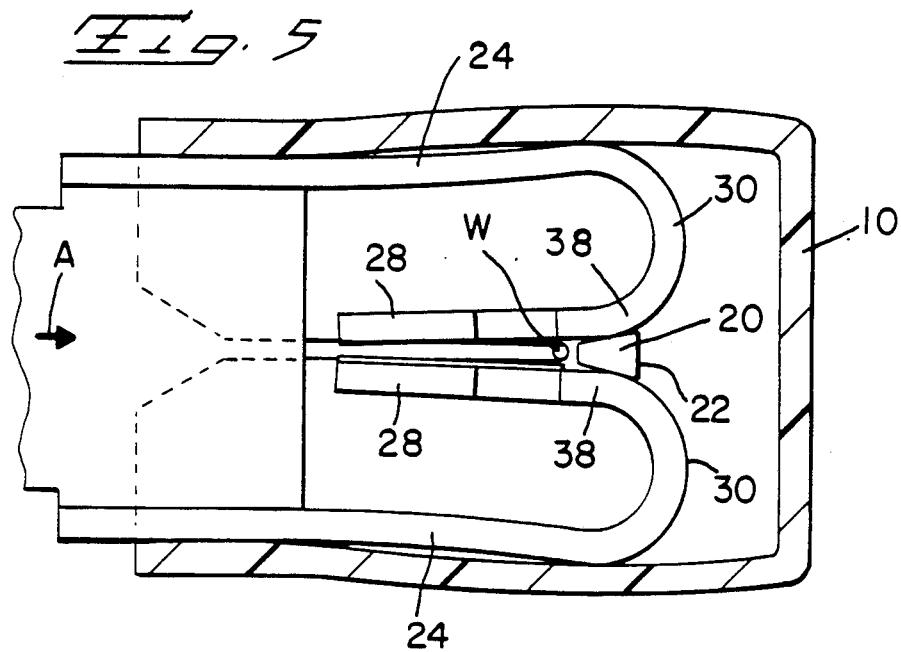
FIG. 5 is a longitudinal sectional view showing the terminal in a partially inserted position in the housing.

The housing 4, which is of rectangular, box-like configuration, comprises opposed pairs of side walls 6, and 8, respectively and a base wall 10, which cooperate to define a cavity 12 for receiving the terminal 2, in the direction of the arrow A in FIGS. 1 and 5. The housing has an open, terminal receiving, end 14 opposite to the base wall 10. The opposed walls 8 are each formed with a wire receiving blind slot 16 extending from the open end 14 towards the base 8, the slots 16 being rectilinear, being aligned with one another and being parallel to the walls 6, the closed end 17 of each slot 16 being spaced from the base 10. Each slot 16 has a flared mouth 18 opening into the open end 14 of the housing 4, for receiving and guiding a varnish insulated fine magnet wire W into the slot. Formed integrally with each side wall 8 in alignment with the slot 16 therein and being positioned proximate to the closed end 17 thereof, is a wedge 20 tapering towards the slot 16 and having a flat base 22 extending at right angles to the slot 16 and parallel to the base wall 10.

The terminal 2 comprises a pair of flat first plates 24 connected together in parallel superposed relationship by a planar web 26 extending at right angles to the plates 24. A second plate 28 is connected to each plate 24, in parallel relationship thereto, by a resilient bight 30 of the terminal material in such a way that the plates 28 lie in superposed, parallel, contiguous relationship, and are urged against one another by the resilient action of the bights 30. Opposite edges 32 of each plate 28 are each formed with a notch 34 which is of rectangular shape, the notches 34 in each edge 32 of one plate 28 each being in precise alignment with a notch 34 of the other plate 28. The relative positioning and arrangement of the wedges 20 and the notches 34 are best seen in FIG. 7. The notch 34 in one edge of each plate 28 is in precise alignment with the notch 34 on the other edge of that plate 28 and is positioned proximate to the corresponding bight 30. The bights 30 are so formed as to provide a wire guiding mouth 36 having wedge guiding surfaces 38 which diverge in a direction away from the plates 28. The plates 24 project, in a direction away from the mouth 36, for a substantial distance beyond the plates 28, the web 26 being positioned beyond the plates 28 in said direction. A tab 40 for use in connecting the terminal 22 to a lead (not shown) projects from the web 26 and is coplanar therewith.

The lower (as seen in FIGS. 3, 4A and 4B) plate 28 is formed with serrations 42, defined by grooves 44, each serration 42 being surmounted by two insulation piercing blades 46 extending in parallel spaced relationship from a position proximate to the mouth 36, which is at the leading end of the terminal 2, towards the trailing end thereof, as best seen in FIG. 3, further serrations 46 being provided along the outer edges of the mouths of the two outermost grooves 44. The blades 46 project slightly above the inner, or wire engaging face 48 of said lower plate 28, the opposed and proximate wire engaging face 50 of the upper plate 28 being planar.

FIG. 8 shows a sheet metal blank from which the terminal 2 was formed, parts of the blank, from which parts of the terminal 2 were formed, being reference in the same way as those parts but with the addition of a prime symbol. As will be apparent from FIG. 8, the terminals are formed integrally with a carrier strip 52.

Figure 6:
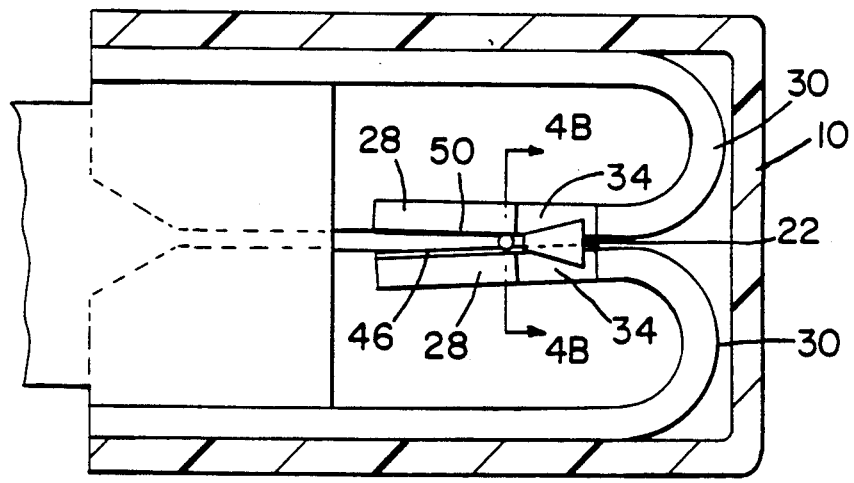
FIG. 6 is a similar view to that of FIG. 5, but showing the terminal when it has been fully inserted into the housing.

For use, the housing 4 may be mounted upon, or may be formed integrally with, an insulating bobbin (not shown) of an electrical coil, for example, a field coil of a small electric motor, with the mouths 18 of the slots 16 facing away from the bobbin. When a winding of the coil is to be connected to an external lead, an end of the winding, constituting the wire W, is passed into both of the slots 16 by way of their guiding mouths 18 so as to lie against the closed ends of the slots 16 and thus to span the cavity 12 at a position adjacent to the tapered ends of the wedges 20. The terminal 2 is then inserted into the cavity 12, through the open end 14 of the housing 4, with the bights 30 of the terminal 2 leading, and with the plates 24 parallel to the side walls 6. As the surfaces 38 of the bights 30 engage the wedges 20 as shown in FIG. 5, the plates 28 are initially cammed apart, against the resilient action of the bights 30, in the vicinity of their junctions with the bights 30 to receive the wire W between the plates 28, until the wedges 20 enter the notches 34 as shown in FIG. 6 (upon full insertion of the terminal 2 into the housing 4) permitting the plates 28 resile and thereby to grip the wire W tightly between their proximate wire engaging surfaces 48 and 50, whereby the blades 46 are forced through the varnish insulation of the wire W to make electrical contact therewith. The fully inserted terminal 2 (FIGS. 2 and 6) cannot now be withdrawn from the cavity 12 since the flat bases 22 of the wedges 20 interfere with the leading edges of the notches 34.

During the insertion of the terminal 2, the housing 4 initially flexes slightly to receive it as shown in FIG. 5, but resiles to assume its original shape upon full insertion of the terminal 2, as shown in FIG. 6.

The connector described above is particularly useful for the connection of fine magnet wires, for example of 0.10 to 0.20 millimeters in diameter, since the wire W freely enters between the plates 28 until they resile to grip it, frictional wear on the wire W being thereby avoided. If the connector is to be used with uninsulated wire, insulation piercing means need not be provided.

What is claimed is:

1. An electrical connector comprising:
   an electrically insulating housing having walls defining a terminal receiving cavity, the housing having an open end and an opposite end, two opposed walls of the housing each being formed with a wire receiving slot extending from said open end towards said opposite end;
   an electrical terminal provided with a pair of interconnected, superposed wire gripping plates having aligned openings therein, the terminal being insertable into the cavity through said open end to make electrical connection with a wire extending through said wire receiving slots;
   means biassing said wire gripping plates resiliently against one another with opposed faces thereof in contiguous face to face relationship;
   and wedge means projecting from the housing into the cavity for forcing the plates apart from each other to receive the wire between said opposed faces of the plates as the terminal is being inserted into the cavity, the wedge means and the openings in the plates being so relatively arranged that when the terminal has been inserted into the housing, the wedge means enter said openings to permit the plates to resile against the wire to grip it.

2. A connector according to claim 1, wherein the plates are connected to the remainder of the terminal by bights having inclined surfaces which diverge from one another in the direction of insertion of the terminal into the cavity, for guiding the wedge means between the plates.

3. A connector according to claim 1, wherein each wire gripping plate is connected by means of a resilient bight to a further plate, said further plates being interconnected in parallel, spaced, relationship and containing the wire gripping plates between them, said further plates serving to guide the terminal into the cavity.

4. A connector according to claim 1, wherein the wedge means comprise a pair of wedges one projecting from each of said opposed walls, the openings being in the form of notches provided in opposite edges of each wire gripping plate.

5. A connector according to claim 4, wherein each wedge is positioned proximate to a closed end of one of the wire receiving slots and between such end and said opposite end of the housing, each wedge tapering towards said opposite end of the housing.

6. A connector according to claim 5, wherein each wedge has a base which is flat, and which extends at right angles to the direction in which the terminal is inserted into the cavity.

7. A connector according to claim 1, wherein one of the plates is provided with means for piercing the insulation on the wire, said insulation piercing means comprising serrations extending in the direction of insertion of the terminal into the cavity.

8. A connector according to claim 7, wherein each serration has a crest provided with insulation piercing blades.

9. A one-piece stamped and formed electrical terminal comprising a pair of first plates connected together in spaced, opposed, substantially parallel relationship, by means of a web; and a pair of second plates arranged in superposed, substantially parallel, contiguous relationship between said first plates and each being connected to one of the first plates by a bight, the bights cooperating to urge proximate faces of the second plates against one another and defining a mouth opening in a direction away from the second plates, each second plate having formed in an edge thereof which is adjacent to said mouth, a notch which is in alignment with a corresponding notch in the other one of the second plates.

10. A terminal according to claim 9, wherein the proximate face of one of the second plates is formed with insulation piercing means projecting towards the proximate face of the other of the second plates said insulation piercing means comprising insulation piercing blades formed on serrations defined by grooves formed said proximate face of said one second plate said proximate face of said other second plate being plane.

* * * * *